July 2, 1935.  L. G. WITBECK  2,007,066
SAFETY DEVICE
Filed Oct. 2, 1934
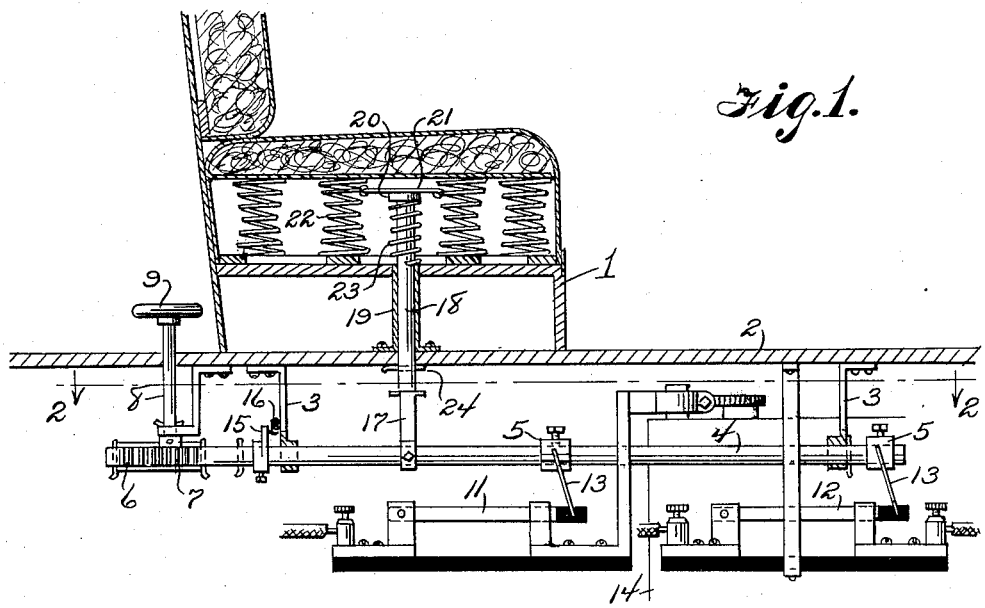
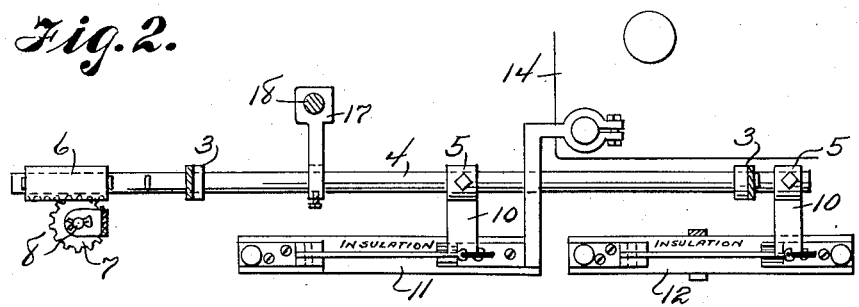
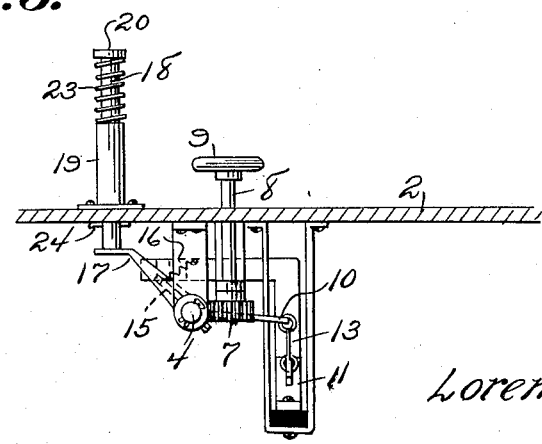
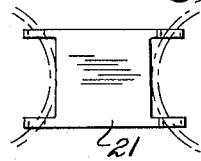
Lorenzo G. Witbeck
INVENTOR
BY Victor J. Evans & Co.
ATTORNEY Patented July 2, 1935

2,007,066

UNITED STATES PATENT OFFICE 2,007,066

SAFETY DEVICE

Lorenzo G. Witbeck, Albany, N. Y.

Application October 2, 1934, Serial No. 746,567

4 Claims. (Cl. 180—82)

This invention relates to safety devices for automobiles and has for the primary object the provision of a device of this character which may be readily adjusted to interrupt the ignition and other electrical circuits of an automobile when an attempt is made to start and run said automobile by an unauthorized person thereby materially decreasing the chance of the automobile being stolen.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary sectional view of an automobile showing a safety device applied thereto and constructed in accordance with my invention.

Figure 2 is a sectional view taken on the line 2—2 of Figure 1.

Figure 3 is an end view, partly in section, illustrating the device.

Figure 4 is a detail view showing the connection between the invention and the driver's seat of the automobile.

Referring in detail to the drawing, the numeral 1 indicates a fragmentary portion of the driver's seat and 2 a fragmentary portion of a floor of an automobile and secured to and depending from the floor 2 is a support in the form of a series of hangers 3, some of which rotatably and slidably support a shaft 4, the latter being limited in sliding movement by collars 5 adjustably secured to said shaft by set screws whereby the location of the collars on the shaft may be varied for the purpose of allowing the sliding movement of the shaft to be varied. A rack bar 6 in the form of a sleeve is journaled on the shaft 4 and held against endwise movement with respect to said shaft and meshes with a pinion 7 secured to an operating shaft 8 which projects through the floor 2 and has secured thereto an operating handle or wheel 9. Certain of the collars 5 are provided with laterally extending arms 10 connected to switches 11 and 12 through links 13. The connection between the shaft 4 and the switches 11 and 12 is such that the rotation of the shaft in one direction will open said switches and the movement of the shaft in an opposite direction will close said switches. The switch 11 is connected in the electric circuit of the automobile which includes the battery or other electrical source 14. The switch 12 is connected in the circuit between the starter of the automobile and the usual ignition switch. An arm 15 is secured to the shaft 4 and has connected thereto a coil spring 16 acting to position the shaft 4 for normally closing the switches. The spring 16 is carried by one of the hangers of the support.

A pedal 17 is secured to the shaft 4 and extends upwardly and outwardly therefrom and when said shaft is in one of its positions it underlies a slidably mounted plunger 18. The plunger is mounted in a sleeve 19 carried by the floor 2 and the frame of the driver's seat and the upper end of the plunger is equipped with a head 20 contacting with a plate 21 mounted on certain springs 22 of the driver's seat. A coil spring 23 is interposed between the upper end of the sleeve 19 and the head and acts to urge the plunger 18 upwardly to contact with the plate 21. The upward movement of the plunger is limited by a pin 24 contacting with the floor 2. When the shaft 4 is adjusted endwise to bring the pedal 17 under the plunger, a person occupying the driver's seat will cause a downward movement of the plunger and through the rocking motion of the shaft 4 from said sliding movement of the plunger will open the switch and interrupt the ignition and other circuits of the automobile, consequently preventing the engine of the automobile from being started. Through the manipulation of the hand wheel 9 the shaft 4 may be adjusted endwise to move the pedal 17 out of alignment with the plunger 18. Consequently, the driver's seat may be occupied and the automobile driven in the usual manner. It is to be understood that the hand wheel 9 is to be secreted in the automobile or if desired a suitable locking means may be provided therefor.

While the present invention has been described as adapted to an automobile it is to be understood that the device may be readily employed in connection with any other form of vehicle, boat or similar device.

Having described the invention, I claim:

1. A safety device comprising a manually adjusted switch operating shaft, a switch opened and closed by said shaft and connected in an electric circuit of an engine of a vehicle, and means between said shaft and the driver's seat of the vehicle whereby said switch will be caused to open the circuit by the seat being occupied by a person when the shaft is in one of its adjusted positions.

2. A safety device comprising a support, a manually adjusted switch operating shaft rotatably and slidably mounted to said support, switch connecting means carried by said shaft, a switch connected in an electric circuit of an engine of a vehicle and connected to said means, and means between said shaft and the driver's seat of the vehicle whereby said switch will be caused to open the circuit by the seat being occupied by a person when the shaft is in one of its adjusted positions.

3. In combination with an automobile having a driver's seat and floor, a support carried by the floor, a shaft rotatably and slidably mounted to said support, means for limiting the sliding movement of said shaft, a manual means for imparting sliding movement to the shaft in opposite directions, a switch connected to said shaft and to a circuit of the engine of the automobile, spring means normally positioning the shaft to close the switch, and means between the shaft and the seat for effecting rotation of the shaft to open the switch on the seat being occupied by a person.

4. In combination with an automobile having a driver's seat and floor, a support carried by the floor, a shaft rotatably and slidably mounted to said support, means for limiting the sliding movement of said shaft, a manual means for imparting sliding movement to the shaft in opposite directions, a switch connected to said shaft and to a circuit of the engine of the automobile, spring means normally positioning the shaft to close the switch, a plunger slidably secured to the floor and connected with the seat, and a pedal carried by the shaft and adapted to be positioned in alignment with the plunger during one of the positions of the shaft so that said shaft will be rotated by the seat being occupied by a person for effecting opening of the switch.

LORENZO G. WITBECK.